Nov. 28, 1967     E. KÖLLE     3,355,211
ADJUSTABLE SEAT CONSTRUCTION FOR MOTOR VEHICLES
Filed Nov. 23, 1965
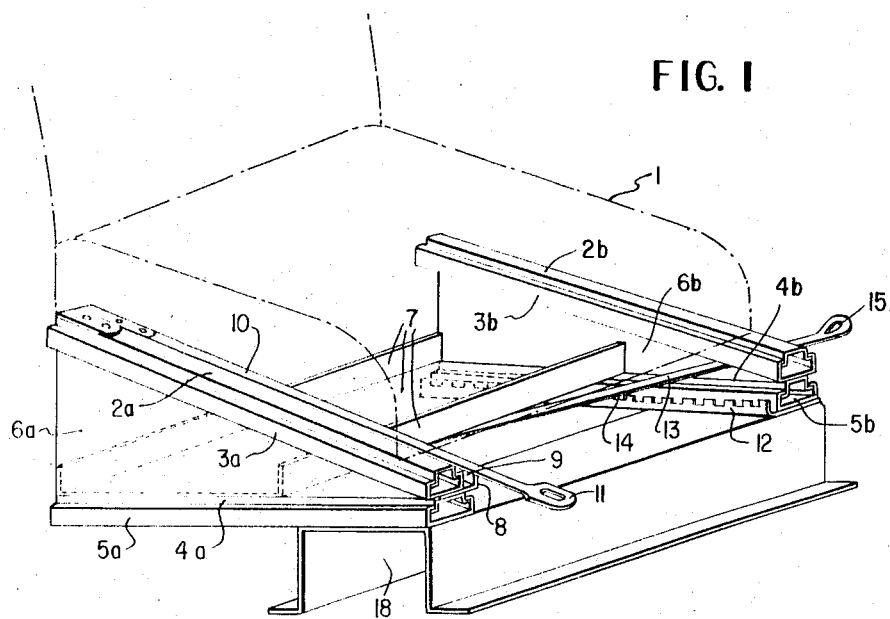
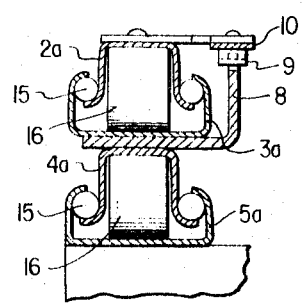
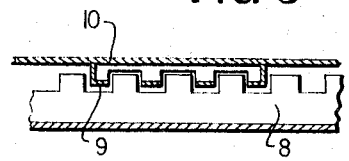
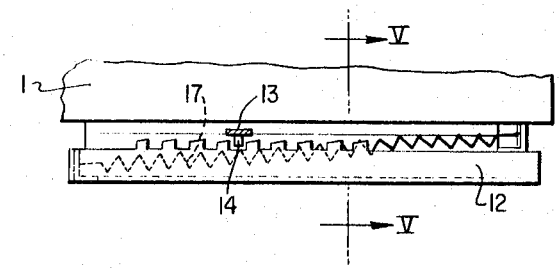
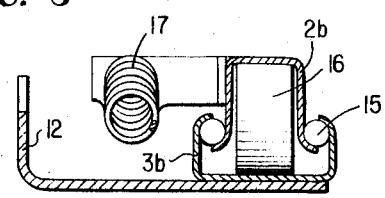
INVENTOR
ERWIN KÖLLE
BY Dicke & Craig
ATTORNEYS 3,355,211
ADJUSTABLE SEAT CONSTRUCTION FOR MOTOR VEHICLES
Erwin Kölle, Sindelfingen, Germany, assignor to Daimler-Benz Aktiengesellschaft, Stuttgart-Unterturkheim, Germany
Filed Nov. 23, 1965, Ser. No. 509,394
Claims priority, application Germany, Nov. 28, 1964, D 45,944
18 Claims. (Cl. 296—65)

The present invention relates to an improvement and further development of horizontally and vertically adjustable seats, especially for motor vehicles. The known seats of this type are supported either on pivot levers or on a rectilinear guide means inclined from in front toward the rear. A disadvantage of both of these prior art supports is that with a change of the height adjustment of the seats, simultaneously also the horizontal position thereof and therewith the distance thereof from the vehicle foot pedals and the handles at the dashboard changes considerably which, in turn, represents a considerable change and inconvenience for the driver.

The present invention eliminates this drawback and essentially consists in that the frame of the seat or its seat trough is provided with conventional, horizontal guide means and the horizontal guide means are supported on inclined guide means inclined from in front toward the rear.

Such an arrangement makes it possible to realize the height adjustment of the seat by means of the inclined guide means and to annul the horizontal displacement of the seat, necessarily connected therewith, by its horizontal guide means. Additionally, one may adjust the seat horizontally without having to adjust at the same time its height.

Accordingly, it is an object of the present invention to provide an adjustable seat, especially for motor vehicles which eliminates the aforementioned drawbacks and shortcomings encountered with the prior art constructions.

Another object of the present invention resides in a horizontally and vertically adjustable seat, especially for motor vehicles, which makes it possible to adjust the seat either vertically without having to accept a simultaneous horizontal, adjustment or horizontally without simultaneously adjusting the height of the seat.

A further object of the present invention resides in a vertically and horizontally adjustable seat, especially for motor vehicles, which is simple in construction, permits ready pre-assembly and may be installed as preassembled unit into the vehicle.

A still further object of the present invention resides in a vertically and horizontally adjustable seat, especially for motor vehicles, which not only achieves the aforementioned aims and objects in a particularly effective manner but which may also be installed subsequently into existing vehicles.

These and further objects, features, and advantages of the present invention will become more obvious from the following description, when taken in connection with the accompanying drawing, which shows, for purposes of illustration only, one embodiment in accordance with the present invention, and wherein:

FIGURE 1 is a perspective view of a seat adjusting installation in accordance with the present invention;

FIGURE 2 is a vertical transverse cross-sectional view, on an enlarged scale, through the rectilinear guide means of the seating trough or seat frame for its horizontal and vertical adjustment;

FIGURE 3 is a partial cross-sectional view through the securing or locking mechanism for a rectilinear guide means, taken along line 3—3 of FIGURE 2;

FIGURE 4 is a somewhat schematic side elevational view, illustrating a further construction of the securing or locking mechanism in conjunction with an adjusting spring; and FIGURE 5 is a cross-sectional view, on an enlarged scale, taken along line V—V of FIGURE 4.

Referring now to the drawing wherein like reference numerals are used throughout the various views to designate like parts, and more particularly to FIGURE 1, reference numeral 1 designates in this figure the seat indicated in dash and dot lines which is supported on two sliding rails 2a and 2b, normally arranged in the vehicle longitudinal direction. The sliding rails 2a and 2b are axially guided in horizontal rails 3a and 3b. The forward ends of the horizontal rails 3a and 3b rest also fixedly on sliding rails 4a and 4b disposed vertically therebelow, whereby the sliding rails 4a and 4b extend at an inclination downwardly to the rear and are also guided rectilinearly in guide rails 5a and 5b. The angular space between the pairs of rails is filled by sheet metal webs 6a and 6b secured thereto. The two webs 6a and 6b are again connected with each other by a U-shaped bent sheet metal base panel 7. An upright toothed rail 8 (FIG. 2) is secured at one of the upper slide rails, for instance at slide rail 2a. A toothed locking means 9 (FIG. 3) engages into the toothed rail 8. The toothed locking means 9 is arranged on a springy or elastic lever arm 10 whose rearward end is secured at the rearward end of the sliding rail 2a. The forward end of lever arm 10 is provided with a handle 11 (FIG. 1) that projects beyond the forward end of the seat 1. The spring effect of the lever 10 causes the toothed locking means 9 to engage with the toothed rail 8 as long as the handle 11 is not lifted. A similar toothed rail 12 is provided adjacent the inclined guide rail 5b. The locking lever 13 associated with the toothed rail 12 and provided with the toothed locking means 14 is arranged transversely to the seat 1 and is provided with a handle 15 laterally projecting beyond the seat 1.

The sliding rails 2a, 2b, and 4a, 4b move in the respective guide rails 3a, 3b, and 5a, 5b on balls 15 and rollers 16. Additionally, the sliding rails may be under the influence of draw springs 17 (FIG. 5) arranged adjacent the toothed rails 8 and 12 which force the respective sliding rails into a preferred position as soon as the toothed locking means 9 or 13 are lifted. Such a spring is preferred especially for the inclined guidance in such a manner that it seeks to pull the seat upwardly. With the horizontal guidance, the spring 17 appropriately pulls the seat in the forward direction.

As indicated in FIGURE 4 the rearward edges of the rail teeth may be cut to be inclined from above both downwardly and forwardly and the forward edges of the toothed locking means may be matched to this inclined configuration whereas the upper edges of the rail teeth slope off downwardly in a forward direction. This arrangement favors a step-wise displacement of the seat with brief, temporary lifting of the toothed locking means.

The present invention makes it possible to displace the seat selectively only horizontally or only vertically or simultaneously in both directions and to adjust and secure the same in a predetermined horizontal or vertical position.

A further advantage of the seat-adjusting mechanism of the present invention consists in that the same can be made as unitary structural sub-assembly and can also be installed subsequently into any vehicle. For purposes of achieving the inclined position, one only needs to support the forward end of the installation, for example, on a vehicle cross bearer 18 and to permit its rear end to rest directly on the vehicle floor.

It is also within the purview and scope of the present invention to replace the toothed-rail adjusting means illustrated herein by threaded-spindle adjusting means or by an electric, pneumatic, or hydraulic adjusting mechanism of conventional construction and to provide, in lieu of the rail guidance, displacing sleeves or the like sliding on rods or pipes. Pressure pistons loaded or acted upon on alternate sides thereof are used for the pneumatic and hydraulic adjusting installations while an electromagnetically controlled linkage may be used for the electric actuation.

Thus, while I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A horizontally and vertically adjustable seat, especially for motor vehicles, comprising seat frame means, horizontal rectilinear guide means for said frame means for guiding the latter substantially in a horizontal direction, and inclined guide means operatively connected with said horizontal guide means and sloping downwardly in the rearward direction, said horizontal guide means supported for independent actuation on said inclined guide means to enable in effect horizontal and vertical adjustments of the seat independently of one another.

2. The seat according to claim 1, wherein said guide means include guide rail means, sliding rail means sliding within said guide rail means, and selectively releasable toothed locking means operatively associated with said rail means.

3. The combination according to claim 2, wherein said toothed locking means includes toothed rail means located adjacent said sliding and guide rail means, and springy means secured at said sliding guide rail means for engagement in said toothed rail means.

4. The seat according to claim 3, wherein said springy means include springy lever arms provided with toothed detent means, the lever arm for the horizontal adjustment of the seat being arranged in the longitudinal direction of the seat and the lever arm for the height adjustment transversely to the seat.

5. The seat according to claim 4, wherein said springy lever arms project beyond the seating surface, as viewed in plan view, and are provided thereat with handle portions.

6. The seat according to claim 5, further comprising sheet metal web means connecting with each other the guide rail means of one and the same side of the seat, and transverse reinforcing means in the form of a U-shaped panel open in the upper direction and interconnecting said web means.

7. The seat according to claim 6, further comprising spring means operatively connected with said rectilinear guide means and seeking to displace the seat upon disengaged toothed locking means into a preferred direction.

8. The seat according to claim 7, wherein said preferred directions are the forward and upward directions.

9. A seat according to claim 7, wherein the motor vehicle is provided with a cross bearer and a vehicle floor, and wherein the adjusting mechanism consisting of said rail means and the reinforcing connecting means thereof is installed as a unit in the vehicle in such a manner that the unit rests with its forward end on said cross bearer and with its rear end directly on the vehicle floor.

10. The seat according to claim 1, further comprising electrically actuated adjusting means for adjusting the seat in said horizontal and inclined guide means.

11. The seat according to claim 1, further comprising hydraulically actuated adjusting means for adjusting the seat in said horizontal and inclined guide means.

12. The seat according to claim 1, further comprising pneumatically actuated adjusting means for adjusting the seat in said horizontal and inclined guide means.

13. The seat according to claim 2, further comprising sheet metal web means connecting with each other the guide rail means of one and the same side of the seat, and transverse reinforcing means in the form of a U-shaped panel open in the upper direction and interconnecting said web means.

14. The seat according to claim 1, further comprising spring means operatively connected with said rectilinear guide means and seeking to displace the seat upon disengaged toothed-locking means into a preferred direction.

15. A seat according to claim 13, wherein the motor vehicle is provided with a cross bearer and a vehicle floor, and wherein the adjusting mechanism consisting of said rail means and the reinforcing connecting means thereof is installed as a unit in the vehicle in such a manner that the unit rests with its forward end on said cross bearer and with its rear end directly on the vehicle floor.

16. A horizontally and vertically adjustable seat, especially for motor vehicles, comprising seat frame means and means for adjusting said seat frame means in the horizontal and vertical direction in effect, independently of one another including substantially horizontal rectilinear guide means operatively connected with said frame means for guiding the latter substantially in a horizontal direction and inclined rectilinear guide means sloping downwardly in the rearward direction for guiding said first-mentioned guide means and thereby to enable adjustment of seat in its vertical position.

17. The seat according to claim 16, wherein said guide means include guide rail means, sliding rail means, which are guided by and slide within said guide rail means, and selectively releasable locking means between respective guide and sliding rail means.

18. The combination according to claim 17, wherein said locking means includes toothed rail means located adjacent one of said rail means, and springy detent means secured at the other of said rail means for engagement in said toothed rail means.

References Cited

UNITED STATES PATENTS

| | | | |
|---|---|---|---|
| 2,983,545 | 5/1961 | Garyet et al. | 296—65 |
| 3,044,829 | 7/1962 | Dolgorukov | 248—429 |

BENJAMIN HERSH, *Primary Examiner.*

L. D. MORRIS, *Assistant Examiner.*